US006980961B2

(12) United States Patent
Watanabe

(10) Patent No.: US 6,980,961 B2
(45) Date of Patent: Dec. 27, 2005

(54) COMPUTER PROGRAM CAPABLE OF CHANGING A SALES ITEM TO ANOTHER SALES ITEM WITH SIMPLE OPERATION

(75) Inventor: Motohisa Watanabe, Tokyo (JP)

(73) Assignee: NEC Infrontia Corporation, Kawasaki (JP)

( * ) Notice: Subject to any disclaimer, the term of this patent is extended or adjusted under 35 U.S.C. 154(b) by 168 days.

(21) Appl. No.: 10/259,328

(22) Filed: Sep. 30, 2002

(65) Prior Publication Data

US 2003/0036961 A1 Feb. 20, 2003

Related U.S. Application Data

(62) Division of application No. 09/657,360, filed on Sep. 7, 2000.

(30) Foreign Application Priority Data

Sep. 7, 1999 (JP) ............................................ 11-252753

(51) Int. Cl.[7] .............................................. G06F 17/60
(52) U.S. Cl. ....................................................... 705/16
(58) Field of Search ..................................... 705/16–25

(56) References Cited

U.S. PATENT DOCUMENTS

| | | | |
|---|---|---|---|
| 4,530,067 A | | 7/1985 | Dorr |
| 5,235,509 A | | 8/1993 | Mueller et al. |
| 5,262,938 A | | 11/1993 | Rapoport et al. |
| 5,353,219 A | | 10/1994 | Mueller et al. |
| 5,510,979 A | | 4/1996 | Moderi et al. |
| 5,589,676 A | | 12/1996 | Iguchi |
| 5,602,730 A | * | 2/1997 | Coleman et al. ............... 705/15 |
| 5,682,151 A | | 10/1997 | Oliveros |
| 5,845,263 A | | 12/1998 | Camaisa et al. |
| 5,943,054 A | | 8/1999 | Hirano et al. |
| 6,008,799 A | | 12/1999 | Van Kleek |
| 6,049,776 A | | 4/2000 | Donnelly et al. |
| 6,049,780 A | | 4/2000 | Fuyama |
| 6,188,406 B1 | | 2/2001 | Fong et al. |
| 6,209,034 B1 | | 3/2001 | Gladwin et al. |
| 6,441,808 B1 | * | 8/2002 | Hashimoto .................. 345/173 |
| 6,529,879 B1 | * | 3/2003 | Hasegawa ..................... 705/16 |

FOREIGN PATENT DOCUMENTS

| | | | |
|---|---|---|---|
| EP | 0 749 080 A2 | * | 6/1996 |
| JP | 62-168294 | | 7/1987 |
| JP | 2806845 | | 7/1998 |
| JP | 2856682 | | 11/1998 |
| JP | 11-66432 | | 3/1999 |

OTHER PUBLICATIONS

White, Ron, How Computers Work Millennium Ed. Que Corporation, Sep. 1999.*
Derfler, Frank J. et. al. How Networks Work, Millennium Ed., Que Corporation, Jan. 2000.*
Gralla, Preston, How the Internet Works, Millennium Ed., Que Corporation, Aug. 1999.*

* cited by examiner

Primary Examiner—Andrew J. Fischer
(74) Attorney, Agent, or Firm—Foley & Lardner LLP

(57) ABSTRACT

A POS registering system is disclosed, that comprises a menu having a plurality of menu keys and at least one selection key, at least one sales item being assigned to each of the menu keys, each of the selection key being used to select one of sales items assigned to each of the menu keys, a table containing entries of sales item data of the sales items assigned to each of the menu keys, the sales item data including a sales item name and a prices of each sales item, and a display device, wherein when an operation including a selecting a menu key is performed for designating a sales item on the menu, entries of sales item data of all sales items assigned to the selected menu key are searched from the table and all the searched entries of sales item data are displayed on the display device in such a manner that they are distinguished from entries of correction alternative sales item data of the remaining sales items assigned to the menu key, and wherein when an operator selects one of the entries of the correction alternative sales item data displayed on the display device, the selected entry of the correction alternative sales item data is treated as an entry to be processed.

4 Claims, 17 Drawing Sheets

FIG. 2

104: MENU KEYBOARD

| SK1 FIRST SELECTION KEY | SK2 SECOND SELECTION KEY | SK3 THIRD SELECTION KEY | SK4 FOURTH SELECTION KEY | | | | | | |
|---|---|---|---|---|---|---|---|---|---|
| MK 1 | MK 2 | MK 3 | MK 4 | MK 5 | MK 6 | MK 7 | MK 8 | MK 9 | MK 10 |
| MK 11 | MK 12 | MK 13 | MK 14 | MK 15 | MK 16 | MK 17 | MK 18 | MK 19 | MK 20 |
| MK 21 | MK 22 | MK 23 | MK 24 | MK 25 | MK 26 | MK 27 | MK 28 | MK 29 | MK 30 |
| MK 31 | MK 32 | MK 33 | MK 34 | MK 35 | MK 36 | MK 37 | MK 38 | MK 39 | MK 40 |
| MK 41 | MK 42 | MK 43 | MK 44 | MK 45 | MK 46 | MK 47 | MK 48 | MK 49 | MK 50 |

| CLEAR | ↑ | 9 | 6 | 3 | ↵ |
|---|---|---|---|---|---|
| ← | → | 8 | 5 | 2 | 0 |
|  | ↓ | 7 | 4 | 1 |  |

FIG. 4

108: PLU TABLE

| SALES ITEM CODE | SALES ITEM NAME | PRICE |
|---|---|---|
| 0 0 1 1 | ONE APPLE | 1 0 0 |
| 0 0 1 2 | ONE ORANGE | 1 0 0 |
| ⋮ | | |
| 0 0 1 5 | ONE WATERMELON | 1 0 0 0 |
| 0 0 1 6 | SELECTION 1, ONE SMALL EEL | 5 0 0 |
| | SELECTION 2, ONE MEDIUM EEL | 8 0 0 |
| | SELECTION 3, ONE LARGE EEL | 1 0 0 0 |
| | SELECTION 4, ONE VERY LARGE EEL | 1 5 0 0 |
| | SELECTION 5, ONE ULTRA LARGE EEL | 3 0 0 0 |
| ⋮ | | |
| 0 0 2 1 | ONE BAG OF TWO APPLES | 1 8 0 |
| 0 0 3 1 | ONE BAG OF SIX APPLES | 5 0 0 |
| 0 0 4 1 | ONE BAG OF TEN APPLES | 8 0 0 |
| ⋮ | | |
| 4 9 0 0 0 1 | ONE TOBACCO | 2 2 0 |
| 4 9 0 0 0 2 | ONE CHOCOLATE | 1 2 0 |
| ⋮ | | |

FIG. 5

| 112:KEY TABLE | KEY CODE OF SK1 | KEY CODE OF SK2 | KEY CODE OF SK3 | KEY CODE OF SK4 |
|---|---|---|---|---|
| KEY CODE OF MK1 | 0011 | 0021 | 0031 | 0041 |
| KEY CODE OF MK2 | 0012 | 0022 | 0032 | 0042 |
| KEY CODE OF MK3 | 0013 | 0023 | 0033 | |
| KEY CODE OF MK4 | 0014 | 0024 | 0034 | |
| KEY CODE OF MK5 | 0015 | 0016 | 0016 | |
| KEY CODE OF MK6 | 0016 | 0016 | 0016 | 0016 |
| ... | | | | |

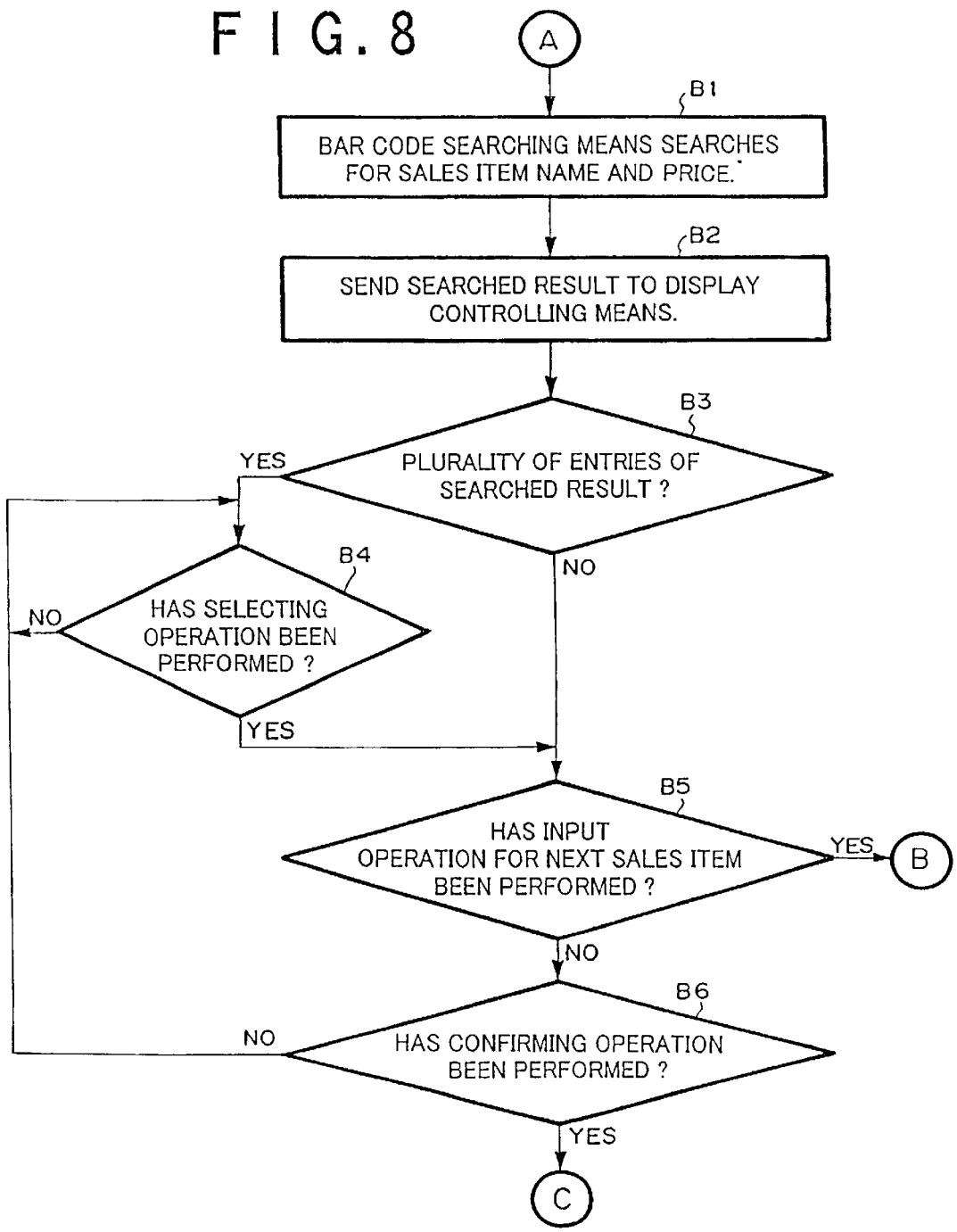

FIG. 9A

1. ONE APPLE  100 YEN    2. ONE BAG OF TWO APPLES 180 YEN
3. ONE BAG OF SIX APPLES 500 YEN   4. ONE BAG OF TEN APPLES  800 YEN

FIG. 9B

1. ONE APPLE    2. ONE BAG OF TWO APPLES 180 YEN
3. ONE BAG OF SIX APPLES 500 YEN   4. ONE BAG OF TEN APPLES  800 YEN

FIG. 9C

1. ONE APPLE    2. ONE BAG OF TWO APPLES 180 YEN
3. ONE BAG OF SIX APPLES 500 YEN   4. ONE BAG OF TEN APPLES  800 YEN

F I G. 10

| 1. | ONE WATERMELON | 1000 YEN |

F I G. 11A

| 1. | ONE EEL | 500 YEN | 2. | ONE MEDIUM EEL | 800 YEN |
| 3. | ONE LARGE EEL | 1000 YEN | 4. | ONE VERY LARGE EEL 1500 YEN ↓ |

F I G. 11B

| 3. | ONE LARGE EEL | 1000 YEN | 4. | ONE VERY LARGE EEL 1500 YEN ↑ |
| 5. | ONE ULTRA LARGE EEL 3000 YEN |

FIG. 14

| | POSITION OF SB1 | POSITION OF SB2 | POSITION OF SB3 | POSITION OF SB4 | POSITION OF SB5 | POSITION OF SB6 |
|---|---|---|---|---|---|---|
| POSITION OF MB1 | 0011 | 0021 | 0031 | 0041 | 0051 | 0061 |
| POSITION OF MB2 | 0012 | 0022 | 0032 | 0042 | 0052 | 0062 |
| POSITION OF MB3 | 0013 | 0023 | 0033 | 0043 | 0044 | 0063 |
| POSITION OF MB4 | 0014 | 0024 | 0034 | | | |
| POSITION OF MB5 | 0015 | | | | | |
| POSITION OF MB6 | 0016 | 0016 | 0016 | 0016 | 0016 | |
| ... | | | | | | |
| POSITION OF MB12 | | | | | | 0066 |

208: PLU TABLE

| SALES ITEM CODE | SALES ITEM NAME | PRICE |
|---|---|---|
| 0 0 1 1 | APPLE | 1 0 0 |
| 0 0 1 2 | ORANGE | 1 0 0 |
| 0 0 1 3 | | |
| 0 0 1 4 | | |
| 0 0 1 5 | WATERMELON | 1 0 0 0 |
| 0 0 1 6 | SELECTION 1, SMALL EEL | 5 0 0 |
| | SELECTION 2, MEDIUM EEL | 8 0 0 |
| | SELECTION 3, LARGE EEL | 1 0 0 0 |
| | SELECTION 4, VERY LARGE EEL | 1 5 0 0 |
| ⋮ | SELECTION 5, ULTRA LARGE EEL | 3 0 0 0 |
| 0 0 2 1 | ORANGE JUICE | 1 0 0 |
| 0 0 2 2 | APPLE JUICE | 1 0 0 |
| 0 0 3 1 | CAKE | 2 5 0 |
| 0 0 3 2 | BREAD | 2 0 0 |
| 0 0 4 1 | BEEF | 8 0 0 |
| 0 0 4 2 | PORK | 5 0 0 |
| 0 0 5 1 | RADISH | 2 0 0 |
| 0 0 5 2 | CARROT | 2 0 0 |
| 0 0 6 1 | FRYING PAN | 3 0 0 0 |
| 0 0 6 2 | PAN | 2 0 0 0 |
| ⋮ | | |
| 4 9 0 0 0 1 | TOBACCO | 2 2 0 |
| 4 9 0 0 0 2 | CHOCOLATE | 1 2 0 |
| 4 9 0 0 0 3 | | |
| 4 9 0 0 0 4 | | |
| 4 9 0 0 0 5 | | |
| ⋮ | | |

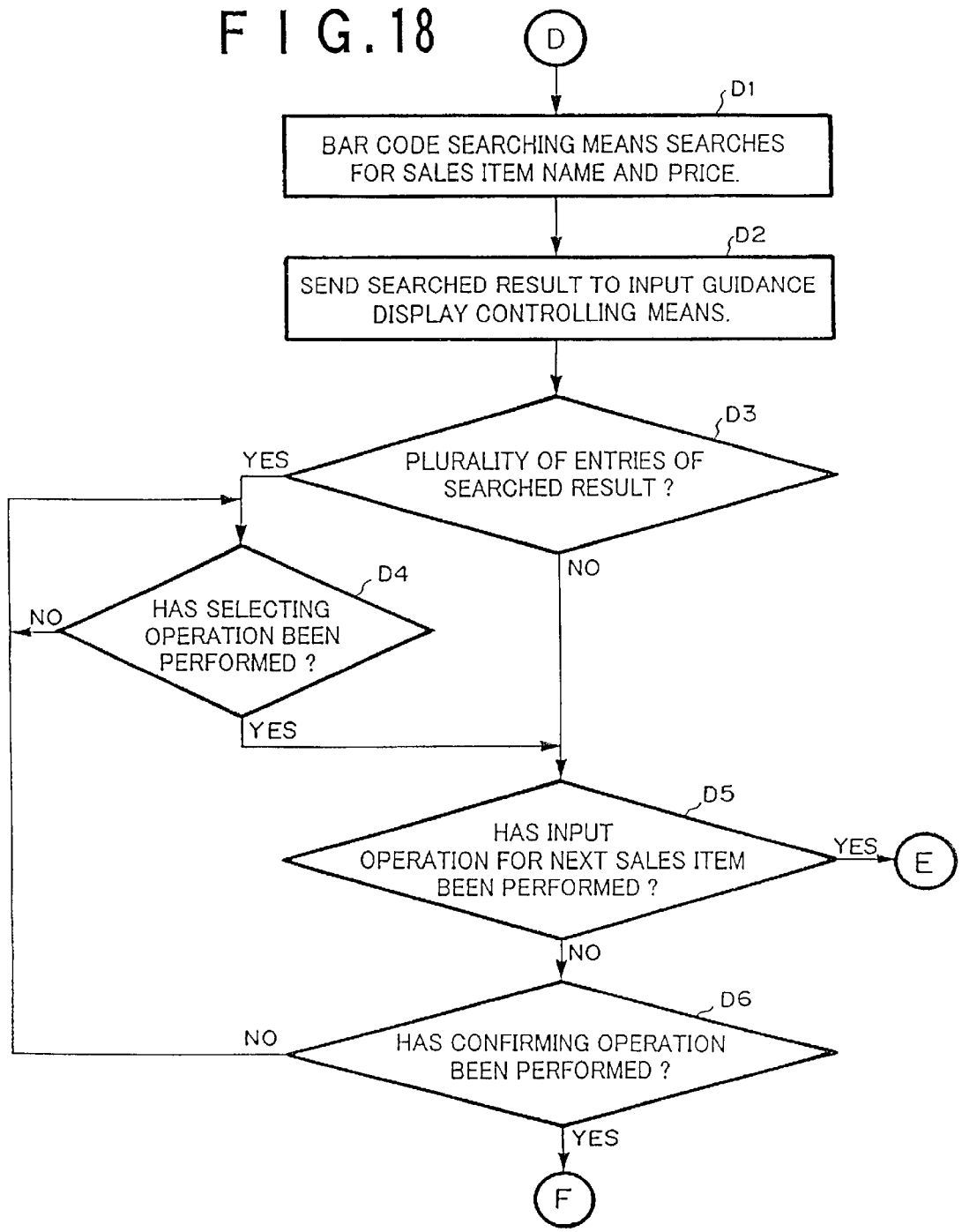

COMPUTER PROGRAM CAPABLE OF CHANGING A SALES ITEM TO ANOTHER SALES ITEM WITH SIMPLE OPERATION

CROSS-REFERENCE TO RELATED PATENT APPLICATIONS

This application is a division of application Ser. No. 09/657,360, filed Sep. 7, 2000, now pending, and related to two concurrently filed applications, entitled: POS Registering System Capable of Changing a Sales Item to Another Sales Item with Simple Operation (Attorney Docket No. 040447-0239) and Computer Program Capable of Changing a Sales Item to Another Sales Item with Simple Operation (Attorney Docket Nos. 040447-0242), and based on Japanese Patent Application No. 11-252753, filed Sep. 7, 1999, by Motohisa Watanabe. This application claims only subject matter disclosed in the parent application and therefore presents no new matter.

BACKGROUND OF THE INVENTION

1. Field of the Invention

The present invention relates to a POS registering system for registering sales items using keys and buttons disposed on a menu keyboard or a touch panel input device, in particular, a POS registering system that allows an operator to easily correct sales items that have been mistakenly input.

2. Description of the Prior Art

In conventional POS registering systems, as their input devices, bar code input devices, menu keyboards, touch panel input devices, and so forth are used.

In a POS registering system using a bar code input device as its input device, a sales registering process is performed in the following manner. In the sales registering process, a bar code of a sales item to be registered is read by the bar code input device. Sales item data including the sales item name and the prices thereof corresponding to the bar code that has been read is searched from a price look-up (PLT) table stored in the POS registering system or a server and the sales item data is displayed on a display device. In addition, the sum of sales items that a customer will buy is calculated corresponding to the searched sales item data and a receipt thereof is issued. The searched sales item data is transferred to the server.

In a POS registering system using a menu keyboard as its input device, unique sales item codes corresponding to sales items to be registered are pre-assigned to menu keys. When an operator presses one of the menu keys, as with the searching process for a sales item code using a bar code, sales item data corresponding to the sales item code is searched from a PLU table and the searched sales item data is displayed on a display device. When the operator confirms that the displayed sales item data matches the menu key that he or she has pressed, a sales registering process is performed corresponding to the searched sales item data. In this case, since the number of sales items that can be assigned depends on the number of menu keys, two sales item codes are assigned to each menu key. In addition, a selection key that allows the operator to select one of two sales items assigned to one menu key is disposed. A sales item code depending on whether or not the selection key has been operated is registered.

In a POS registering system using a touch panel input device as its input device, an input screen including a plurality of menu buttons representing different sales items is displayed on a display device. When an operator touches a menu button, sales item data of the sales item name represented on the touched menu button is searched from a PLU table and displayed on the display device. When the operator knows that the displayed sales item data matches the touched menu button, a sales registering process corresponding to the searched sales item data is performed. In this case, the number of sales item names that can be represented depends on the number of menu buttons. To solve this problem, a plurality of selection buttons for selecting sales item names represented on menu buttons are disposed along with menu buttons displayed on the input screen. Corresponding to a touched selection button, sales item names represented on menu buttons are changed.

However, in the above-described related art references, a POS registering system using a menu keyboard and a POS registering system using a touch panel input device have the following problems.

When a menu keyboard is used as an input device, depending on whether or not a selection key has been pressed, one of two sales items assigned to a menu key is treated as a sales item to be registered. Thus, if the operator forges pressing a selection key or unnecessarily presses it, even if a correct menu key is pressed, an improper sales item will be registered. When the operator has registered a sales item in an incorrect key operation, he or she should cancel the registered sales item and then input a correct sales item. Thus, the operability of the POS registering system is low.

On the other hand, when a touch panel input device is used as an input device, a sales item of a sales item name represented on a touched menu button is processed as a sales item to be registered. However, a sales item name represented on a menu button depends on a selection button that is touched. Thus, when the operator mistakenly operates a selection button, even if he or she presses a correct menu button, an improper sales item different from that to be registered will be registered. When an incorrect sales item has been registered with an improper selection button, as with an improper operation of a menu key, the operator should cancel the mistakenly registered sales item and then input a correct sales item. Thus, as with the case using the menu keyboard, the operability of the POS registering system using the touch panel is low.

SUMMARY OF THE INVENTION

Therefore, an object of the present invention is to provide a POS registering system that allows an operator to easily perform an easy correcting operation against a mistaken key operation of a selection key and/or a selection button on a menu keyboard and a touch panel input device so as to correctly register sales items.

According to a first aspect of the present invention, there is provided a POS registering system, comprising: a menu having a plurality of menu keys and at least one selection key, at least one sales item being assigned to each of the menu keys, each of the selection key being used to select one of sales items assigned to each of the menu keys; a PLU table containing entries of sales item data of the sales items assigned to each of the menu keys, the sales item data including a name and price of each sales item, the entry of sales item data being correlated to a code of the sales item; a key table containing the codes of sales items and operations on the menu in such a manner that a code of a sales item is designated by each operation on the menu; a display device; designated sales item-searching means for searching the key table for a sales item code corresponding to an operation on the menu and further searching the PLU table for an entry of designated sales item data corresponding to the searched sales item code; correction alternative-searching means for searching the key table for sales item codes corresponding to sales items which are assigned to the menu key operated and which have not been designated and further searching the PLU table for entries of correction alternative sales item data corresponding to the searched sales item codes; display-controlling means for displaying the entry of the designated sales item data and the entries of correction alternative sales item data on the display device in such a manner that the entry of the designated sales item data is displayed in a different format from the entries of correction alternative sales item data; and sales item-registering means, when on of the entries of correction alternative sales item data is selected, for registering the selected entry of correction alternative sales item data as an entry to be registered.

In the above POS registering system, the menu may have a special menu key to which a plurality of sales items are assigned, the same sales item code being assigned to the sales items assigned to the special menu key; the PLU table may correlatively contain sales item codes, entries of sales item data of sales items, and entries of selection key information, one sales item code being assigned to a plurality of sales items, entries of selection key information representing selection keys for selecting sales items to which the same sales item code is assigned; the key table may contain sales item codes, each of which is assigned in common to the plurality of sales items assigned to the special menu key; the designated sales item-searching means may search the key table for a sales item code corresponding to an operation, the operation including selecting the special menu key on the menu for designating a sales item, and may further search the PLU table for pairs of an entry of sales item data and an entry of the selection key information corresponding to the searched sales item code; and among entries of sales item data corresponding to the searched sales item code, an entry selected by selecting one of the selection keys may become an entry of the designated sales item data, and entries not selected by selecting one of the selection keys may become entries of correction alternative sales item data.

According to a second aspect of the present invention, there is provided a POS registering system, comprising: a display device; a touch panel input device disposed on the display device; input screen display-controlling means for causing the display device to display an input screen containing a plurality of menu buttons and at least one selection button, each of the menu buttons representing a sales item name of a unique sales item, the selection button being used to select sales item names represented on the menu buttons, and changing the sales item names represented on the menu buttons to those corresponding to the touched selection button when the touching thereon is detected corresponding to an output from the touch panel input device; a button table containing entries of position information of the menu buttons, entries of position information of the selection buttons, and sales item codes in such a manner that a sales item code is designated by a combination of an entry of position information of the menu button and an entry of position information of the selection button; a PLU table containing the sales item codes contained in the button table and entries of sales item data, the sales item data including a name and price of each sales item, the entry of sales item data being correlated to a sales item code; designated sales item-searching means for searching the button table for a sales item code corresponding to a sales item name represented on a menu button touched on the touch panel input device on the basis of an entry of position information of the touched menu button and an entry of a selection button which has most recently been touched, and further searching an entry of designated sales item data corresponding to the searched sales item code; correction alternative searching-means for searching the button table for sales item codes corresponding to sales item names being capable of, but not being, represented on a menu button touched on the touch panel input device on the basis of an entry of position information of the touched menu button and an entry of a selection button which has most recently been touched, and further searching an entry of correction alternative sales item data corresponding to the searched sales item codes; input guidance display-controlling means for causing the display device to display the entry of designated sales item data and the entries of correction alternative sales item data in such a manner that the entry of the designated sales item data is displayed in a different format from the entries of correction alternative sales item data; and sales item-registering means, when on of the entries of correction alternative sales item data is selected, for registering the selected entry of correction alternative sales item data as an entry to be registered.

In the above POS registering system, the input screen may have a special menu button to which a plurality of sales items are assigned, the sale sales item code being assigned to the sales items assigned to the special menu button; the PLU table may correlatively contain sales item codes, entries the of sales item data, and entries of selection button information, each of sales item codes being assigned to a plurality of sales items, each entry of the selection button information represents a selection button which is touched to represent a sales item name of a sales item on the special menu button; the button table may contain sales item codes, each of which is assigned in common to the plurality of sales items corresponding to the sales item names represented on the special menu button; the designated sales item-searching means may search the key table for a sales item code corresponding to a combination of an entry of position information of the special menu button touched on the touch panel input device and an entry of position information of a selection button which has most recently been touched, and may further search the PLU table for pairs of an entry of sales item data and an entry of the selection button information corresponding to the searched sales item code; and among entries of sales item data corresponding to the searched sales item code, an entry selected by selecting one of the selection buttons may become an entry of the designated sales item data, and entries not selected by selecting one of the selection buttons may become entries of correction alternative sales item data.

These and other objects, features and advantages of the present invention will become more apparent in light of the following detailed description of a best mode embodiment thereof, as illustrated in the accompanying drawings.

BRIEF DESCRIPTION OF THE DRAWINGS

FIG. 2 is a schematic diagram showing an example of the structure of a menu keyboard according to the first embodiment of the present invention;

FIG. 4 is a schematic diagram showing an example of the contents (entries) of a PLU table according to the first embodiment of the present invention;

FIG. 5 is a schematic diagram showing an example of the contents (entries) of a key table according to the first embodiment of the present invention;

FIG. 8 is a second part of the flow chart of FIG. 7;

FIGS. 9A, 9B, and 9C are schematic diagrams showing examples displayed on a display device according to the first embodiment of the present invention;

FIG. 10 is a schematic diagram showing an example displayed on the display device according to the first embodiment of the present invention;

FIGS. 11A and 11B are schematic diagrams showing examples displayed on the display device according to the first embodiment of the present invention;

FIG. 14 is a schematic diagram showing an example of contents (entries) of a button table according to the second embodiment of the present invention;

FIG. 15 is a schematic diagram showing an example of contents (entries) of a PLU table according to the second embodiment of the present invention;

FIG. 18 is a flow chart showing an example of a process of the searching means according to the present invention.

DETAILED DESCRIPTION OF THE PREFERRED EMBODIMENTS

Next, with reference to the accompanying drawings, embodiments of the present invention will be described.

[First Embodiment]

Figure 1:
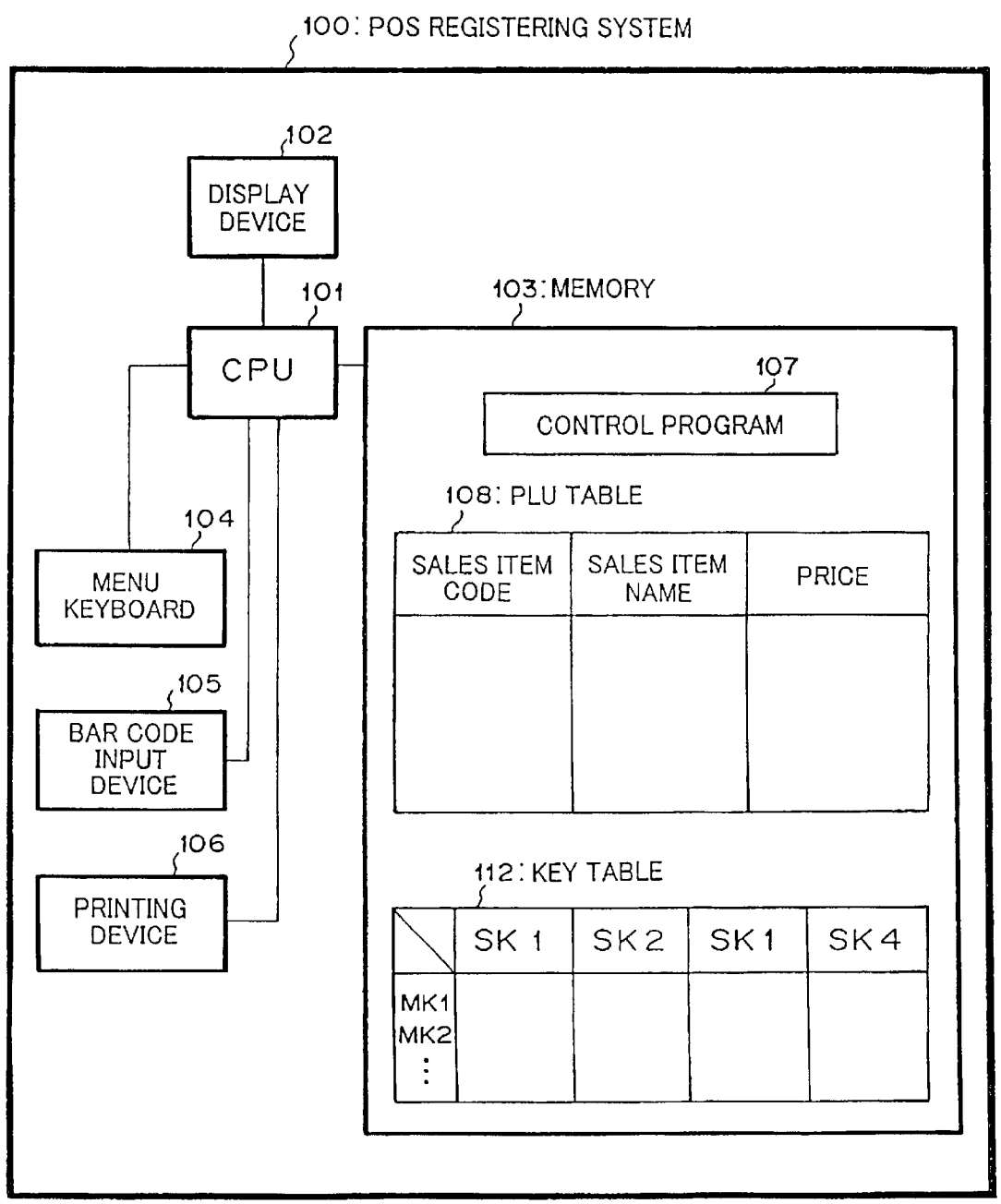
FIG. 1 is a block diagram showing an example of the structure of a first embodiment of the present invention.

FIG. 1 is a block diagram showing an example of the structure of a first embodiment of the present invention.

A POS registering system 100 according to the first embodiment of the present invention is composed of a CPU 101, a display device 102, a memory 103, a menu keyboard 104, a bar code input device 105, and a printing device 106.

The menu keyboard 104 is a keyboard for designating a sales item to be registered. As shown in FIG. 2, the menu keyboard 104 has first to fourth selection keys SK1 to SK4, 50 menu keys MK1 to MK50, numeric input ten keys, a period key, arrow (up, down, left and right) keys, a return key, and a clear key. When the maximum number of sales items assigned to each menu key is "2", the number of selection keys may be "1".

Figure 3:
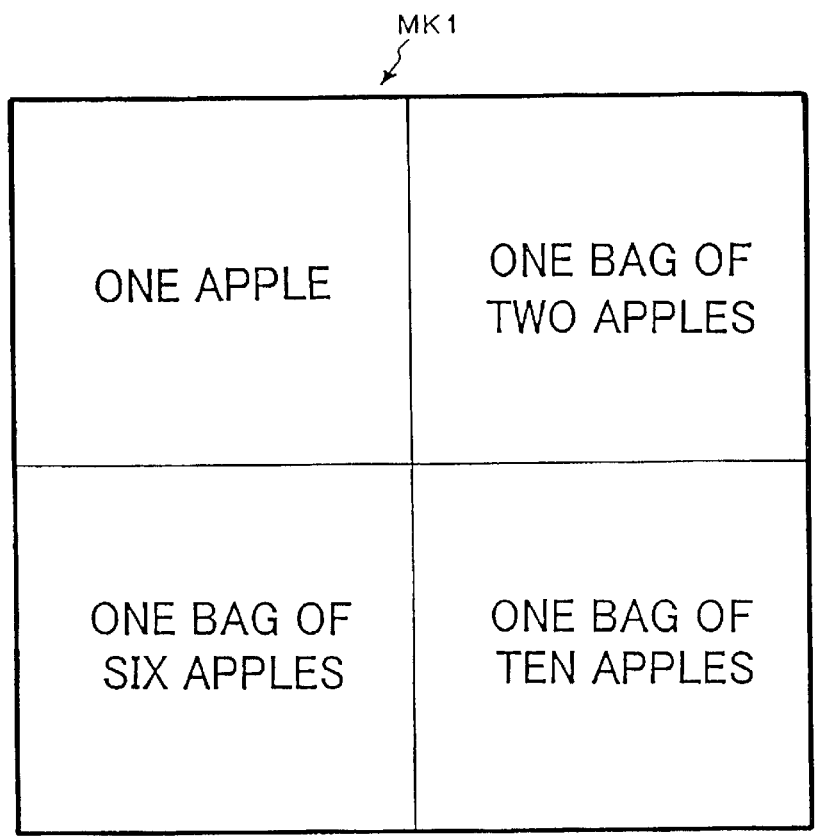
FIG. 3 is a top view showing menu keys according to the first embodiment of the present invention.

Each of the menu keys MK1 to MK50 is assigned one to four sales items. For example, the menu key MK1 is assigned four sales items "one apple", "one bag of two apples", "one bag of six apples", and "one bag of 10 apples". To allow the operator to know these sales items, a seal is adhered on the upper surface of the menu key MK1. As shown in FIG. 3, the seal represents the four sales items. On the other hand, the menu key MK15 is assigned only "one watermelon".

The first to fourth selection keys SK1 to SK4 are keys for selecting one of a plurality of sales items assigned to each of the menu keys MKi (1 ≦i≦50). For example, when the operator selects "one apple" from four sales items assigned to the menu key MK1, he or she presses the first selection key SK1 and then presses the menu key MK1. Likewise, when the operator selects "one bag of two apples", "one bag of six apples", or "one bag of 10 apples", he or she presses the second selection key SK2, the third selection key SK3, or the fourth selection key SK4, respectively, and then presses the menu key MK1. According to the first embodiment of the present invention, when the operator presses only the menu key MK1 rather than one of the selection keys SK1 to SK4, it is assumed that after the first selection key SK1 has been pressed, the menu key MK1 is pressed.

The display device 102 has a display area of two lines or more.

The memory 103 stores a control program 107, a PLU table 108, and a key table 112. The control program 107 is used to control the POS registering system 100.

The PLU table 108 correlatively contains sales item codes assigned to sales items to be registered and entries of sales item data having sales item names of sales items and prices thereof. FIG. 4 shows an example of the contents (entries) of the PLU table 108. As shown in FIG. 4, each sales item code is registered in such a manner that it correlates with at least one entry of sales item data. For example, a sales item code "0011" is registered along with one entry of sales item data "one apple, 100 yen". A sales item code "0016" is registered along with five entries of sales item data "one small eel, 500 yen", "one medium eel, 800 yen", "one large eel, 1000 yen", "one very large eel, 1500 yen, and "one ultra large eel, 3000 yen". Each of a plurality of entries of sales item data assigned to one sales item code contains an entry of selection key information (selection 1, selection 2, . . . ) that represents the relation between a selection key and a sales item. When the number of sales items assigned to one sales item code (as with the sales item code "0016") is larger than the number of selection keys (thus, there is a sales item that cannot be designated with a combination of selection keys and a menu key), an entry of selection key information cannot be added to an entry of sales item data. However, an entry of selection key information that does not substantially exist is added to such an entry of sales item data.

The key table 112 is a table from which a sales item code of a sales item designated by a key operation on the menu keyboard 104 is obtained. On the key table 112, sales item codes are registered in combinations of key odes of the menu keys MK1 to MK50 and key codes of the first to fourth selection keys SK1 to SK4. FIG. 5 shows an example of the contents (entries) of the key table 112. When the second selection key SK2 and the menu key MK1 are pressed on the menu keyboard 104, the key table 112 shown in FIG. 5 shows that a sales item of a sales item code "0021" is designated.

Figure 6:
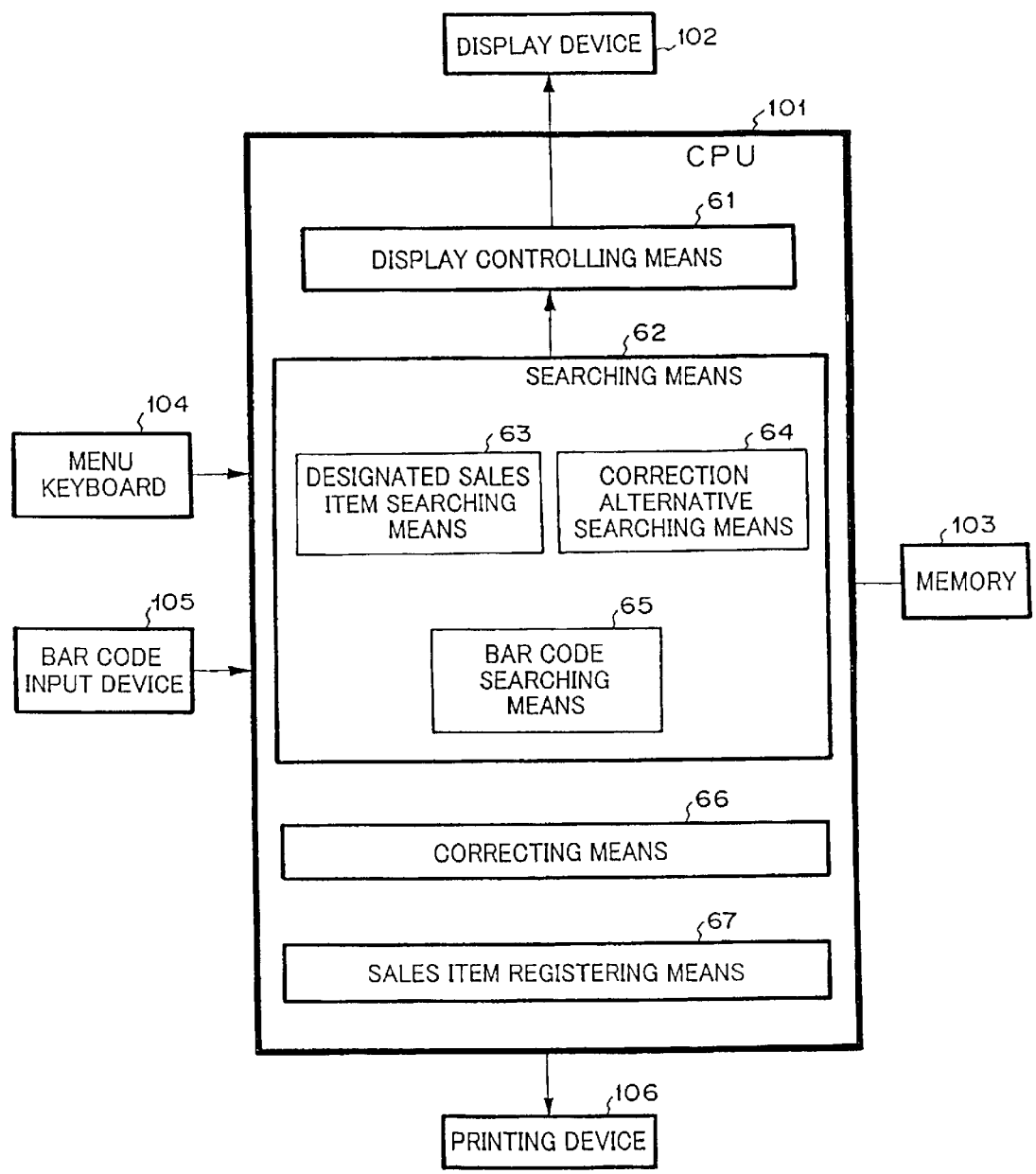
FIG. 6 is a block diagram showing an example of the structure of a CPU according to the first embodiment of the present invention.

FIG. 6 is a block diagram showing an example of the structure of the CPU 101. The CPU 101 comprises a display controlling means 61, a searching means 62, a correcting means 66, and a sales item registering means 67. The searching means 62 has a designated sales item searching means 63, a correction alternative searching means 64, and a bar code searching means 65.

The designated sales item searching means 63 has two searching functions. In the first searching function, when the operator performs a key operation for designating a sales item to be registered using the menu keyboard 104, the designated sales item searching means 63 searches a sales item code corresponding to the key operation (that is a key code that is output from the menu keyboard 104) from the key table 112. In the second searching function, the designated sales item searching means 63 searches an entry of sales item data corresponding to the sales item code that has been searched from the key table 112 from the PLU table 108. In other words, when the operator presses the first selection key SK1 on the menu keyboard 104 and then presses the menu key MK1, the designated sales item searching means 63 searches a sales item code "0011" corresponding to a combination of key codes of the keys SK1 and MK1 from the key table 112 shown in FIG. 5 and then searches an entry of sales item data "one apple, 100 yen" corresponding to the sales item code "0011" from the PLU table 108 shown in FIG. 4.

The correction alternative searching means 64 has two searching functions. In the first searching function, when the operator performs a key operation for designating a sales item to be registered on the menu keyboard 104, the correction alternative searching means 64 searches a sales item code of a sales item that has been assigned to the pressed menu key and that has not been designated by the key operation from the key table 112. In the second searching function, the correction alternative searching means 64 searches an entry of sales item data corresponding to the sales item code that has been searched from the key table 112 as an entry of correction alternative sales item data from the PLU table 108. In other words, when the operator presses the selection key SK1 on the menu keyboard 104 and then presses the menu key MK1, the correction alternative searching means 64 searches sales item codes "0021", "0031", and "0041" corresponding to combinations of key codes of the pressed menu key MK1 and the non-pressed selection keys SK2, SK3, and SK4 from the key table 112 shown in FIG. 5 and then searches entries of sales item data "one bag of two apples, 180 yen", "one bag of six apples, 500 yen", and "one bag of 10 apples, 800 yen" corresponding to the sales item codes "0021", "0031", and "0041" as entries of correction alternative sales item data from the PLU table 108 shown in FIG. 4.

The bar code searching means 65 has a searching function. In other words, when a bar code that represents a sales item code is input from the bar code input device 105, the bar code searching means 65 searches an entry of sales item data corresponding to the bar code (a sales item code) from the PLU table 108.

The display controlling means 61 has two functions. In the first function, the display controlling means 61 causes the display device 102 to display an entry of sales item data searched by the designated sales item searching means 63 and an entry of correction alternative sales item data searched by the correction alternative searching means 64 in different display formats. In the second function, the display controlling means 61 causes the display device 102 to display an entry of sales item data searched by the bar code searching means 65. According to the first embodiment, the display controlling means 61 highlight-displays (reverse-displays or halftone-displays) an entry of sales item data searched by the designated sales item searching means 63 so as to distinguish it from an entry of correction alternative sales item data.

The correcting means 66 has functions for adding, deleting, and updating an entry of data of the PLU table 108.

The sales item registering means 67 has a function for performing a sales registering process for calculating the sum of sales items that the customer will buy corresponding to entries of sales item data searched by the searching means 62, causing the printing device 106 to issue a receipt thereof, and transferring the searched sales item data to the server.

The control program 107 stored in the memory 103 is a program that causes the CPU 101 to operate as a part of the POS registering system. The control program 107 is read by the CPU 101. The operation of the CPU 101 is controlled corresponding to the control program 107. Thus, the display controlling means 61, the searching means 62, the designated sales item searching means 63, the correction alternative searching means 64, the bar code searching means 65, the correcting means 66, and the sales item registering means 67 are accomplished on the CPU 101. According to the first embodiment, the control program 107 is stored in the memory. Alternatively, the control program 107 may be recorded on a record medium such as a disk.

Next, the operation of the first embodiment will be described in detail.

First of all, the operation of the first embodiment in the case that a sales item to be registered is designated with a key operation including a pressing operation of a menu key to which a plurality of sales items have been assigned will be described.

Now, it is assumed that the operator presses the menu key MK1 to which a sales item "one apple" has been assigned on the menu keyboard 104 so as to designate the sales item "one apple". With this key operation, a key code of the menu key MK1 is output from the menu keyboard 104.

When the key code of the menu key MK1 is output from the menu keyboard 104 (at step A1 shown in FIG. 7), the searching means 62 of the CPU 101 sends the key code of the menu key MK1 to the designated sales item searching means 63. Thus, the designated sales item searching means 63 searches a sales item code corresponding to the key code of the menu key MK1 from the key table 112 shown in FIG. 5 (at step A2). When only the menu key MK1 is pressed rather than one of the selection keys SK1 to SK4, as was described above, since it is supposed that after the first selection key SK1 has been pressed, the menu key MK1 is pressed, the designated sales item searching means 63 searches a sales item code "0011" corresponding to a combination of key codes of the menu key MK1 and the selection key SK1 from the key table 112. Thereafter, the designated sales item searching means 63 searches an entry of sales item data "one apple, 100 yen" corresponding to the sales item code "0011" from the PLU table 108 shown in FIG. 4 (at step A3).

Thereafter, the searching means 62 determines whether or not the searched result of the designated sales item searching means 63 contains a plurality of entries of sales item data (at step A4). In this case, since the searched result contains only one entry of sales item data "one apple, 100 yen", the determined result at step A4 is No. Thus, the searching means 62 sends the key code of the menu key MK1 to the correction alternative searching means 64.

Thus, the correction alternative searching means 64 searches a sales item code of a sales item that has assigned and that has not been designated by the operator's key operation from the key table 112. In addition, the correction alternative searching means 64 searches an entry of sales item data corresponding to the sales item code as an entry of correction alternative sales item data from the PLU table 108 (at step A5). In reality, the correction alternative searching means 64 searches sales item codes "0021", "0031", and "0041" corresponding to combinations of the key code of the menu key MK1 and the key codes of the selection keys SK2, SK3, and SK4 that have not been pressed by the operator from the key table 112. In addition, the correction alternative searching means 64 searches entries of sales item data "one bag of two apples, 180 yen", "one bag of six apples, 500 yen", and "one bag of 10 apples, 800 yen" corresponding to the sales item codes "0021", "0031", and "0041" from the PLU table 108, respectively.

Thereafter, the searching means 62 assigns selection key numbers 1 to 4 of the selection keys SK1 to SK4 to the entries of sales item data "one apple, 100 yen", "one bag of two apples, 180 yen", "one bag of six apples, 500 yen", and "one bag of ten apples, 800 yen" searched by the designated sales item searching means 63 and the correction alternative searching means 64 and sends the resultant numbered entries to the display controlling means 61. In addition, the searching means 62 causes the display controlling means 61 to highlight-display the entry of sales item data "one apple, 100 yen" searched by the designated sales item searching means 63 (at step A6).

Thus, the display controlling means 61 causes the display device 102 to display the four numbered entries of sales item data sent from the searching means 62 as shown in FIG. 9A. At this point, the display controlling means 61 causes the display device 102 to highlight-display the entry of sales item data "one apple, 100 yen" searched by the designated sales item searching means 63 so as to distinguish it from the four entries of correction alternative sales item data "one bag of two apples, 180 yen", "one bag of six apples, 500 yen", and "one bag of 10 apples, 800 yen" searched by the correction alternative searching means 64.

When the display device 102 displays data as shown in FIG. 9A, the operator confirms whether or not the highlighted entry of sales item data "one apple, 100 yen" is an entry of sales item data of a sales item to be registered. When the highlighted entry is the entry to be registered, the operator performs an input operation of the next sales item (by inputting a bar code or operating the menu keyboard) and then performing a confirming operation.

When the searching means 62 has determined that the next sales item had been input (namely, the determined result at step A10 is Yes), the searching means 62 causes the sales item registering means 67 to perform a sales process for storing the highlighted entry of sales item data "one apple, 100 yen" to an internal register thereof (at step A11). Thereafter, the flow returns to step A1. On the other hand, when the searching means 62 has determined that the confirming operation had been performed (namely, the determined result at step A12 is Yes), the searching means 62 performs a sales registering process for storing the highlighted-entry of sales item data "one apple, 100 yen" to the internal register and calculating the sum of sales items that the customer will buy corresponding to all entries of sales item data stored in the internal register (at step A13), and then causes the printing device 106 to issue a receipt representing the sales item data of sales items that the customer will buy and the sum thereof (at step A14).

When the operator has correctly operated a menu key and a selection key on the menu keyboard 104 for inputting a sales item, the above-described process is performed. On the other hand, if the operator has incorrectly operated a selection key, the following process will be performed.

Now, it is assumed that the operator tires to register a sales item "one bag of six apples" assigned to the menu key MK1. At this point, as a correct key operation, the operator presses the third selection key SK3 and then presses the menu key MK1. In this example, it is assumed that the operator has incorrectly pressed the fourth selection key SK4 instead of the selection key SK1 and then presses the menu key MK1.

When the operator has performed an incorrect key operation, the designated sales item searching means 63 searches an entry "one bag of 10 apples, 800 yen" as sales item data of a sales item corresponding to the key operation from the PLU table 108 (at steps A3 and A4). On the other hand, the correction alternative searching means 64 searches entries of sales item data "one apple, 100 yen", "one bag of two applies, 180 yen", and "one bag of six apples, 500 yen" of other sales items assigned to the menu key MK1 as entries of correction alternative sales item data from the PLU table 108 (at step A5). Thus, the display controlling means 61 causes the display device 102 to display the four numbered entries of sales item data. At this point, the display controlling means 61 causes the display device 102 to highlight-display the entry of sales item data "one bag of 10 apples, 800 yen" designated by the key operation so as to distinguish it from the other entries of correction alternative sales item data "one apple, 100 yen", "one bag of two applies, 180 yen", and "one bag of six apples, 500 yen".

When the operator sees the contents displayed on the display device 102, since the entry of sales item data "one bag of 10 applies, 800 yen" is highlight-displayed rather than the entry of sales item data "one bag of six apples, 500 yen" that the operator has tried to register, he or she knows that he or she has performed an incorrect key operation. Thus, the operator looks for the entry of sales item data that he or she has tried to register in the entries of the correction alternative sales item data. In this case, as shown in FIG. 9B, the entries of the correction alternative sales item data contain the entry of sales item data "one bag of six apples, 500 yen" that the operator tired to register. Thus, the operator performs a correcting operation for causing the entry number 3 of sales item data "one bag of six apples, 500 yen" to be highlight-displayed (selected) by pressing a key "3" of the ten keys or a left arrow key "[]" on the menu keyboard 104.

When the operator has performed the above-described correcting operation (namely, the determined result at step A8 is Yes), the searching means 62 causes the display controlling means 61 to highlight-display the entry number 3 of sales item data "one bag of six applies, 500 yen" (at step A9). Thus, as shown in FIG. 9C, the display controlling means 61 highlight-displays the entry of sales item data "one bag of six applies, 500 yen".

When the operator knows that the entry of sales item data "one bag of six apples, 500 yen" that he or she has tried to register is highlight-displayed with reference to the contents shown in FIG. 9C, he or she performs an input operation of the next sales item and performs a confirming operation. Thus, the sales item registering means 67 performs a sales registering process for the highlighted entry of sales item data "one bag of six apples, 500 yen" as an entry to be processed rather than the entry of sales item data "one bag of 10 apples, 800 yen" that he or she has mistakenly designated. Thus, according to the first embodiment of the present invention, even if the operator mistakenly performs an incorrect key operation of a selection key, he or she can easily correct a mistake by selecting one of entries of correction alternative sales item data displayed on the display device 102.

Next, an operation in the case that a sales item is designated by a key operation of a menu key to which only one sales item has been assigned will be described.

Now, it is assumed that the operator designates a sales item "one watermelon" with a menu key MK5 (see FIG. 5) of which a sales item code "0015" representing the sales item "one watermelon" has been assigned in a combination of the key code of the menu key MK5 and the key code of the selection key SK1. In this case, the operator presses the selection key SK1 and then presses the menu key MK5. Alternatively, the operator presses only the menu key MK5 rather than the selection key SK1.

Figure 7:
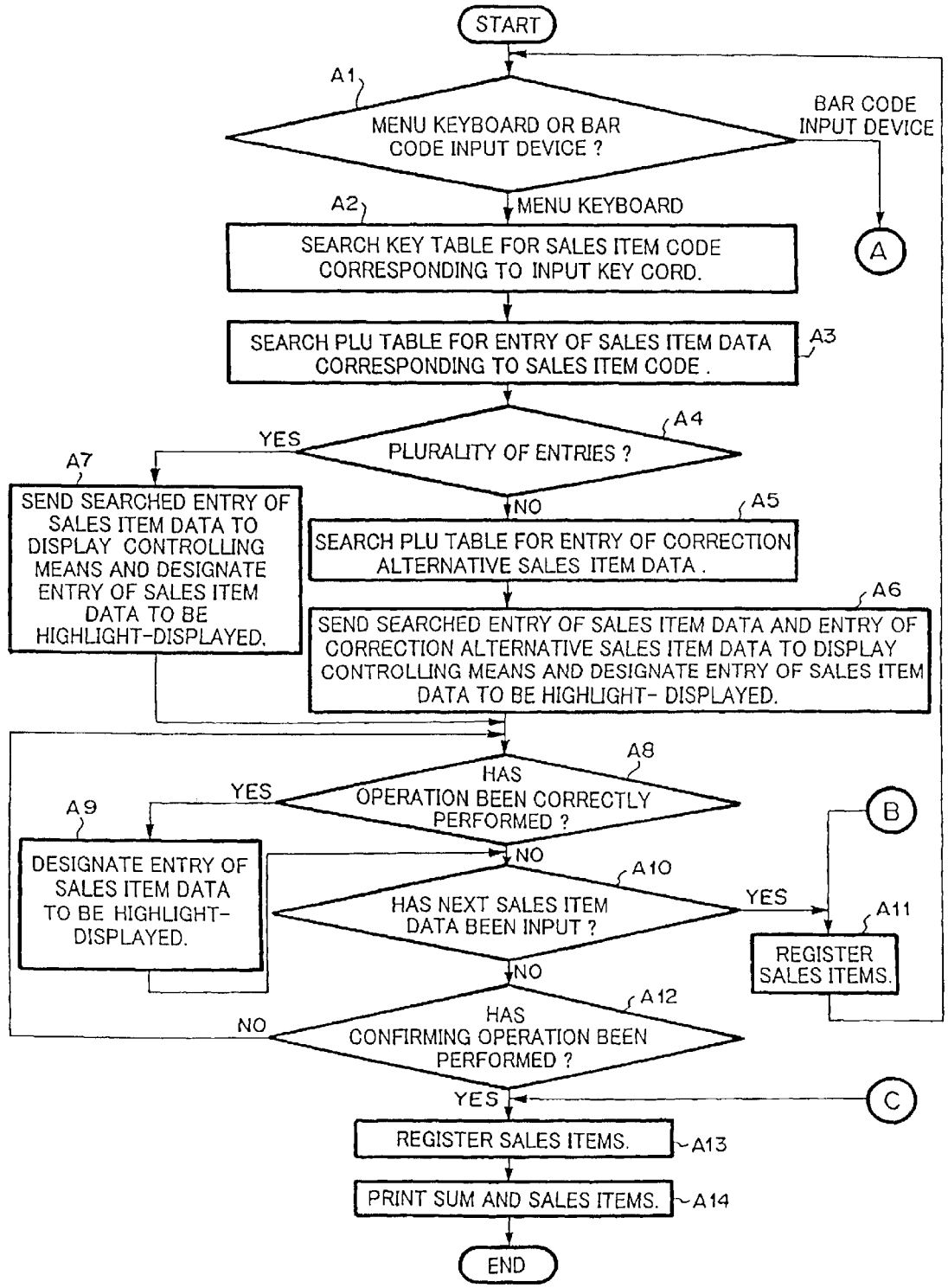
FIG. 7 is a first part of a flow chart showing an example of a process of a searching means according to the first embodiment of the present invention.

When such a key operation is performed, the designated sales item searching means 63 performs a process at steps A2 and A3 shown in FIG. 7. In other words, the designated sales item searching means 63 searches the entry of sales item data "one watermelon, 1000 yen" from the PLU table 108. Thereafter, the correction alternative searching means 64 searches an entry of correction alternative sales item data at step A5. However, since the key table 112 does not contain sales item codes corresponding to the selection keys SK2 to SK4 as shown in FIG. 5. Thus, the correction alternative searching means 64 does not search entries of correction alternative sales item data from the key table 112.

Thereafter, since only the designated sales item searching means 63 has searched the entry of sales item data "one watermelon, 1000 yen", the searching means 62 designates number 1 to the entry of the entry of sales item data and sends the numbered entry to the display controlling means 61 so that the display controlling means 61 so as to highlight-display the entry of sales item data "one watermelon, 1000 yen" (at step A6). Thus, the display controlling means 61 causes the display device 102 to highlight-display the entry of sales item data "one watermelon, 1000 yen" as shown in FIG. 10. When the operator knows that the highlighted sales item data is correct, he or she performs an input operation for the next sales item and performs a confirming operation.

When the operator has performed a correct key operation, the above-described operation is performed. However, when the operator has mistakenly performed an incorrect key operation of a selection key, the following process is performed.

Now, it is assumed that the operator has mistakenly performed an incorrect key operation of a selection key and then pressed the menu key MK5. In other words, the operator has pressed one of the selection keys SK2 to SK4 and then pressed the menu key MK5.

When such a key operation is performed, the designated sales item searching means 63 performs the process of steps A2 and A3 shown in FIG. 7. However, since sales item codes have not been assigned to combinations of the key code of the menu key MK5 and the key codes of the selection keys SK2 to SK4, the designated sales item searching means 63 does not search entries of sales item data.

Thereafter, the correction alternative searching means 64 performs the process of step A5. In other words, the correction alternative searching means 64 searches the entry of sales item data "one watermelon, 1000 yen" as an entry of correction alternative sales item data. Thereafter, the searching means 62 causes the display controlling means 61 to display "1. One watermelon, 1000 yen". When the operator knows that the displayed entry of sales item data is correct, he or she performs an input operation for the next sales item and performs a confirming operation.

Next, a method for registering a plurality of sales items with one sales item code will be described.

As shown in FIG. 5, the same sales item code "0016" has been assigned to combinations of the key code of the menu key MK6 and the key codes of the selection keys SK1 to SK4. In addition, as shown in FIG. 4, the five entries of sales item data "one small eel, 500 yen", "one medium eel, 800 yen", "one large eel, 1000 yen", "one very large eel, 1500 yen", and "one ultra large eel, 3000 yen" corresponding to the sales item code "0016" are contained in the PLU table 108. The sales item name field shown in FIG. 4 contains selection key information that correlatively contains sales items and selection keys.

Now, it is assumed that the operator has pressed the first selection key SK1 and then pressed the menu key MK6 so as to designate the entry "one small eel".

When such a key operation is performed, the designated sales item searching means 63 searches the sales item code "0016" from the key table 112 shown in FIG. 5. In addition, the designated sales item searching means 63 searches pairs of entries of sales item data and entries of selection key information "selection 1, one small eel, 500 yen", "selection 2, one medium eel, 800 yen", "selection 3, one large eel, 1000 yen", "selection 4, one very large eel, 1500 yen", and "selection 5, one ultra large eel, 3000 yen" corresponding to the sales item code "0016" from the PLU table 108 shown in FIG. 4 (at steps A2 and A3 shown in FIG. 7).

When the designated sales item searching means 63 has searched the five pairs of entries of sales item information and entries of selection key information, since the determined result at step A4 is Yes, the searching means 62 performs the process of step A7. In other words, the searching means 62 assigns numbers to the searched entries of the sales item data and sends the numbered entries to the display controlling means 61. In addition, since the operator has pressed the selection key SK1, the searching means 62 causes the display controlling means 61 to highlight-display the entry of sales item data "one small eel, 500 yen" whose selection key information is selection 1.

Thus, the display controlling means 61 causes the display device 102 to display four of five numbered entries of sales item data as shown in FIG. 11A. In addition, the display controlling means 61 causes the display device 102 to highlight-display the entry of sales item data "one small eel, 500 yen". In this example, since the display device 102 has a display area for two lines, it can display only four entries of sales item data.

When the operator knows that the entry of sales item data that he or she has tried to register is highlight-displayed with reference to the contents shown in FIG. 11A, he or she performs an input operation for the other sales item and performs a confirming operation. On the other hand, when the entry of sales item data that the operator has tried to register is not highlight-displayed, he or she performs a correcting operation by inputting a selection number assigned to a relevant entry of correction alternative sales item data with the ten keys. Thereafter, the operator performs an input operation for the next sales item and a confirming operation. When the entry "5. One ultra large eel, 3000 yen" that is not displayed on the display device 102 and that is a sales item that the operator has tried to register, he or she scrolls the screen by pressing the down arrow key or the like as shown in FIG. 11B and then performs a correcting operation by inputting the selection number 5 with the ten keys. Thereafter, the operator performs an input operation for the other sales item and performs a confirming operation.

Next, an operation in the case that a sales item to be registered is designated with the bar code input device 105 will be described.

When the operator inputs a bar code (a sales item code) adhered on a sales item using the bar code input device 105, the searching means 62 sends the input bar code to the bar code searching means 65 (namely, the determined result at step A1 shown in FIG. 7 is Yes). Thus, the bar code searching means 65 searches an entry of sales item data corresponding to the bar code from the PLU table 108. The bar code searching means 65 successively assigns a number to an entry of sales item data and sends the numbered entry to the display controlling means 61 (at steps B1 and B2 shown in FIG. 8). Thus, the display controlling means 61 causes the display device 102 to display numbered entries of sales item data.

When only one entry of sales item data is displayed on the display device 102, after the operator knows that the entry is correct, he or she performs an input operation for the next sales item and performs a confirming operation. When the operator has performed an input operation for the next sales item (namely, the determined result at step B5 is Yes), the searching means 62 causes the sales item registering means 67 to perform a sales registering process for registering the displayed entry of sales item data to the internal register thereof (at step A11 shown in FIG. 7). When the operator has performed the confirming operation (namely, the determined result at step B6 is Yes), the searching means 62 causes the sales item registering means 67 to perform a sales registering process for registering the sales item data to the internal register and calculating the sum of sales items that he or she will buy corresponding to all entries of sales item data registered in the internal register (at step A13 shown in FIG. 7).

On the other hand, when a plurality of entries of sales item data are displayed, the operator performs a selecting operation for inputting a selection number of an entry of sales item data that he or she has tried to register. Thereafter, the operator performs an input operation for the next sales item and performs a confirming operation. When the bar code searching means 65 has searched a plurality of entries of sales item data, it waits until the operator performs the selecting operation (until the determined result at step B4 becomes Yes). Thereafter, the flow advances to step B5. When the operator has performed an input operation for the next sales item and an confirming operation, the searching means 62 causes the sales item registering means 67 to perform a sales registering process corresponding to the entries of sales item data that the operator has selected (at steps A11 and A13 shown in FIG. 7).

[Second Embodiment]

Figure 12:
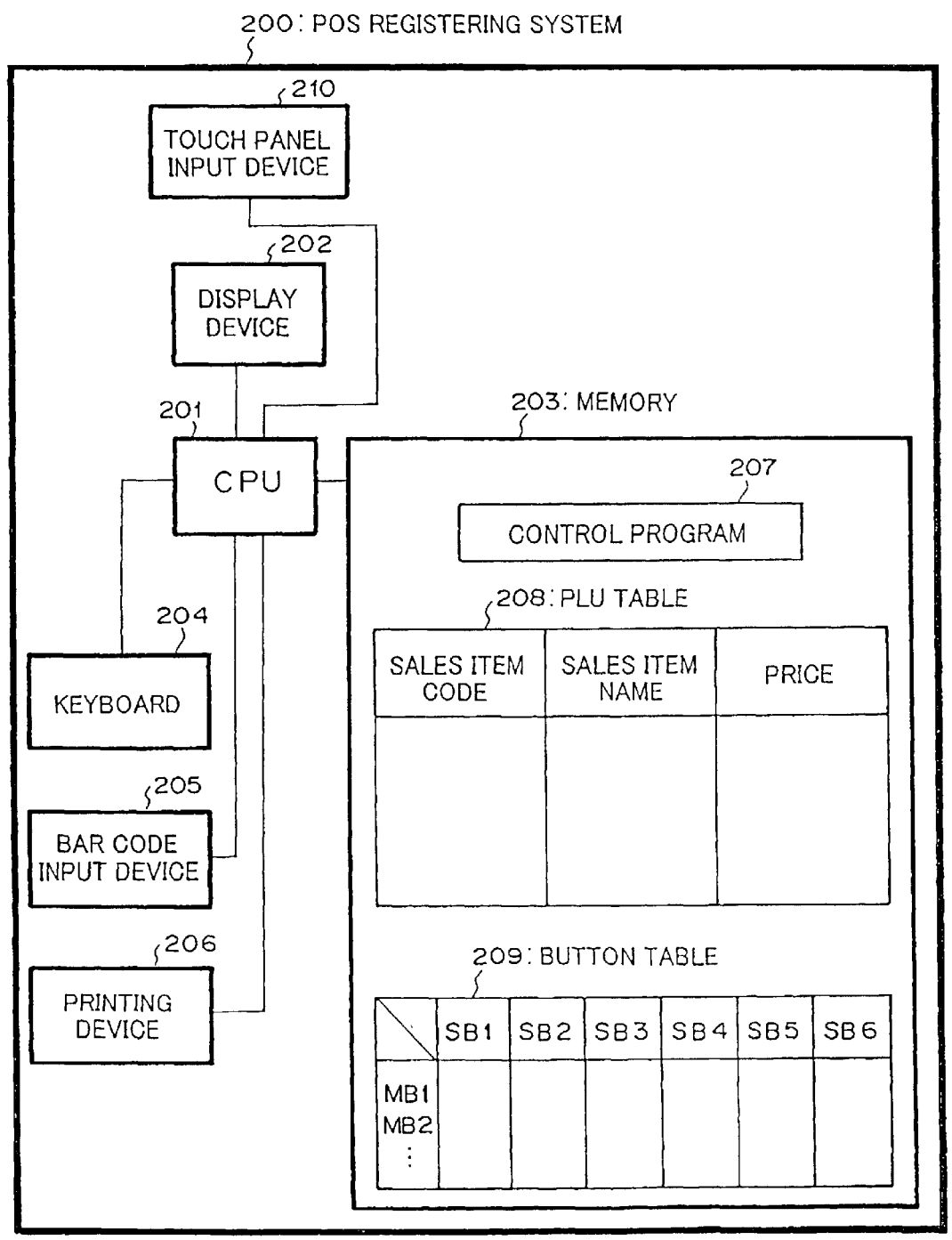
FIG. 12 is a block diagram showing another example of the structure of a second embodiment of the present invention.

Next, another embodiment of the present invention (hereinafter, referred to as second embodiment) will be described. According to the second embodiment, a sales item to be registered is designated with a touch panel input device. FIG. 12 is a block diagram showing an example of the structure of the second embodiment.

As shown in FIG. 12, a POS registering system 200 according to the second embodiment comprises a CPU 201, a display device 202, a memory 203, a keyboard 204, a bar code input device 205, a printing device 206, and a touch panel input device 210.

Figure 13:
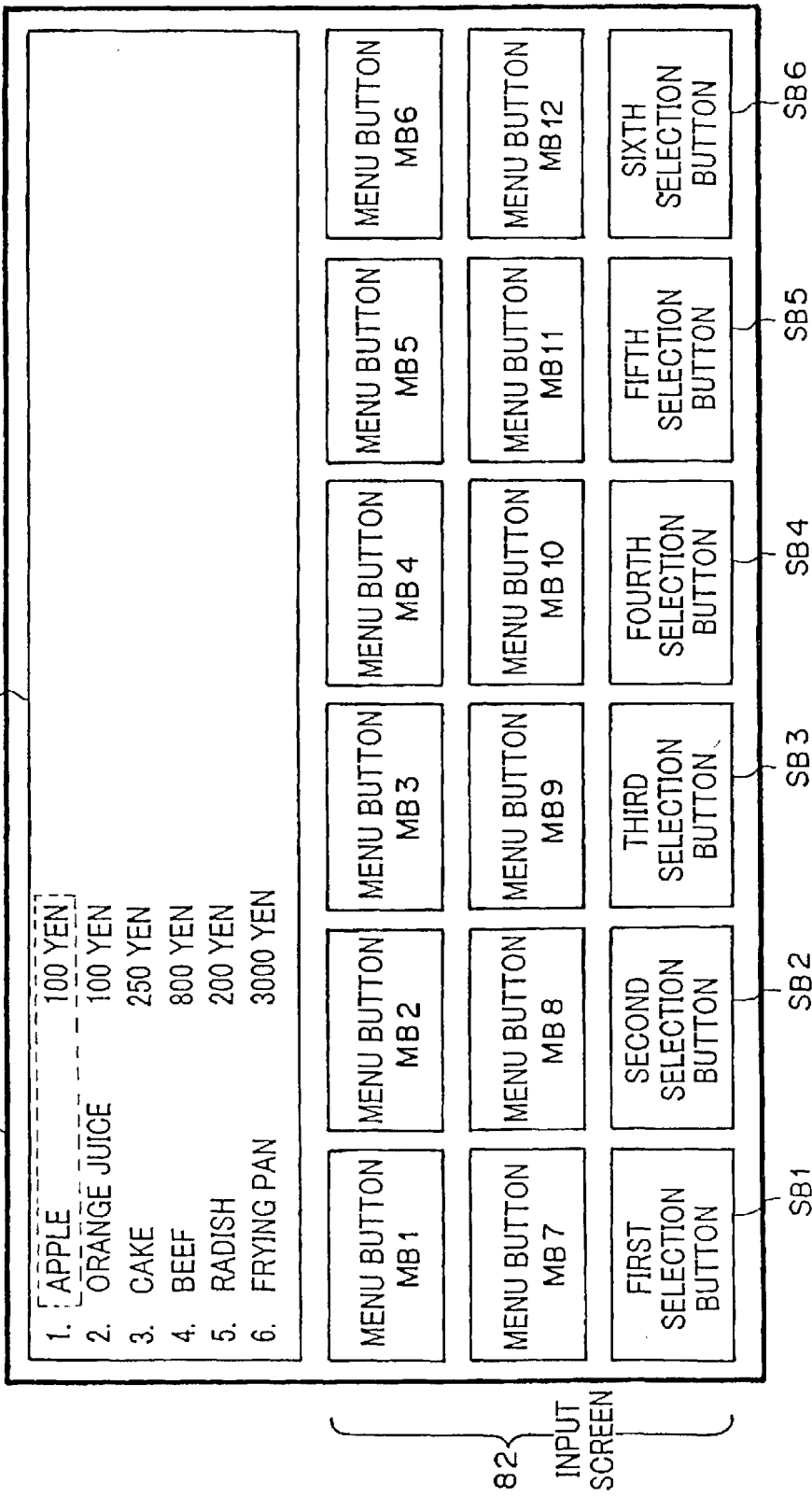
FIG. 13 is a schematic diagram showing an example displayed on a display device.

The display device 202 displays an input guidance portion 81 and an input screen 82 as shown in FIG. 13.

The input screen 82 has a plurality of menu buttons MB1 to MB12 and first to sixth selection buttons SB1 to SB6. The menu buttons MB1 to MB12 represent different sales item names. The operator touches a menu button that represents a sales item name that he or she tries to register. The first to sixth selection buttons SB1 to SB6 are used for the operator to change sales item names represented on the menu buttons MB1 to MB12. According to the second embodiment, to cause sales items categorized as "fruits and bargain items" to be represented on the menu buttons MB1 to MB12, the operator touches the selection button SB1. To cause sales items categorized as "juices" to be represented on the menu buttons MB1 to MB16, the operator touches the selection button SB2. To cause sales items categorized as "bakery" to be represented on the menu buttons MB1 to MB16, the operator touches the selection button SB3. To cause sales items categorized as "meats" to be represented on the menu buttons MB1 to MB16, the operator touches the selection button SB4. To cause sales items categorized as "vegetables" to be represented on the menu buttons MB1 to MB16, the operator touches the selection button SB5. To cause sales items categorized as "miscellaneous" to be represented on the menu buttons MB1 to MB16, the operator touches the selection button SB6.

The touch panel input device 210 has a function for outputting a coordinate value that represents a position that the operator has touched on the screen.

The memory 203 stores a control program 207, a PLU table 208, and a button table 209.

As shown in FIG. 14, the button table 209 correlatively contains entries of position information that represent positions on the screen of the menu buttons MB1 to MB12, entries of position information that represent positions on the screen of the selection buttons SB1 to SB6, and sales item codes. Each entry of position information that represents the position of each button is composed of for example coordinate values of the upper left and lower right positions of the button.

As shown in FIG. 15, the PLU table 208 correlatively contains sales item codes and entries of sales item data including sales item names and prices thereof. Each entry of sales item data corresponding to one sales item code is assigned a unique entry of selection button information that represents a sales item corresponding to a selection button (selection 1, selection 2, and so forth).

Figure 16:
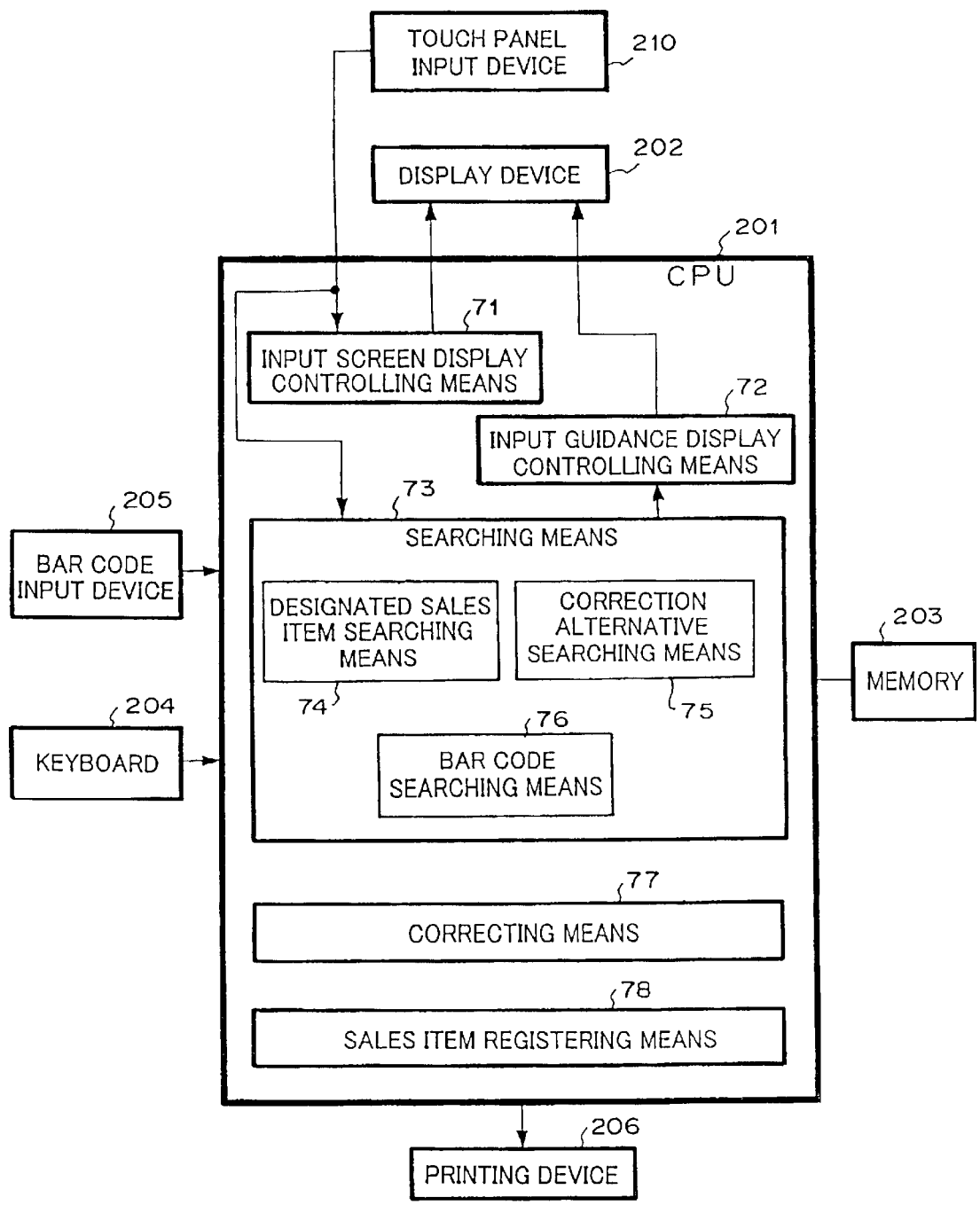
FIG. 16 is a block diagram showing an example of the structure of a CPU according to the second embodiment of the present invention.

As shown in FIG. 16, the CPU 201 comprises an input screen display controlling means 71, an input guidance display controlling means 72, a searching means 73, a correcting means 77, and a sales item registering means 78. The searching means 73 includes a designated sales item searching means 74, a correction alternative searching means 75, and a bar code searching means 76.

The input screen display controlling means 71 has two functions. In the first function, the input screen display controlling means 71 causes the display device 202 to display the input screen 82 containing the menu buttons MB1 to MB12 and the selection buttons SB1 to SB6 as shown in FIG. 13. The menu buttons MB1 to MB12 represent sales item names thereon. In the second function, the input screen display controlling means 71 changes sales item names represented on the menu buttons MB1 to MB12 corresponding to a touched selection button.

When the touch panel input device 210 outputs a coordinate value of a menu button that the operator has touched, the designated sales item searching means 74 searches a sales item code corresponding to the output coordinate value and a coordinate value of a selection button that he or she has most recently touched from the button table 209. In addition, the designated sales item searching means 74 searches an entry of sales item data corresponding to the searched sales item code from the PLU table 208.

When the touch panel input device 210 outputs a coordinate value of a selection button that the operator has touched, the correction alternative searching means 75 searches a sales item code corresponding to a sales item name that has been assigned and that is not represented on the menu button that the operator has touched from the button table 209. In addition, the correction alternative searching means 75 searches an entry of sales item data corresponding to the searched sales item code as an entry of correction alternative sales item data from the PLU table 208.

The bar code searching means 76 searches an entry of sales item data corresponding to a bar code (a sales item code) that is input from the bar code input device 205 from the PLU table 208.

The input guidance display controlling means 72 has two functions. In the first function, the input guidance display controlling means 72 causes the display device 202 to display an entry of sales item data searched by the designated sales item searching means 74 and an entry of correction alternative sales item data searched by the correction alternative searching means 75 in the input guidance portion 81 in different display formats. In the second function, the input guidance display controlling means 72 causes the display device 202 to display an entry of sales item data searched by the bar code searching means 76 in the input guidance portion 81.

The correcting means 77 has a function for adding, deleting, and updating data contained in the PLU table 208.

The sales item registering means 78 has a function for performing a sales registering process for calculating the sum of sales items that the customer will buy corresponding to entries of sales item data searched by the searching means 73 and transferring entries of sales item data that have been searched to the server.

The control program 207 stored in the memory 203 is a program that causes the CPU 201 to operate as a part of the POS registering system. The control program 207 is read by the CPU 201. By controlling the operation of the CPU 201, the input screen display controlling means 71, the input guidance display controlling means 72, the searching means 73, the designated sales item searching means 74, the correction alternative searching means 75, the bar code searching means 76, the correcting means 77, and the sales item registering means 78 are accomplished on the CPU 201. According to the second embodiment of the present invention, the control program 207 is stored in the memory 203. Alternatively, the control program 207 can be stored to another record medium such as a disk.

Next, the operation of the second embodiment of the present invention will be described.

When the operator will register a sales item on the input screen 82 of the display device 202 with the touch panel input device 210, he or she touches a selection button corresponding to a category of a sales item that he or she will register.

When a sales item that the operator will register is an "apple", he or she touches the selection button SB1 to cause sales item names of sales items categorized as "fruits and bargain items" to be represented on the menu buttons MB1 to MB12. Thus, a coordinate value of the selection button SB1 that the operator has touched is output from the touch panel input device 210. When the input screen display controlling means 71 of the CPU 201 has determined that the selection button SB1 had been touched corresponding to the coordinate value that had been output from the touch panel input device 210, the input screen display controlling means 71 changes sales item names represented on the menu buttons MB1 to MB12 corresponding to the selection button SB1. As the result of the process of the input screen display controlling means 71, the sales item name "apple" is represented on the menu button MB1. When a sales item name of a sales item that the operator will register is represented on a menu button, it is not necessary to operate any selection button. When the sales item name "apple" is represented on the menu button MB1, the operator touches the menu button MB1. Thus, the coordinate value of the menu button MB1 is output from the touch panel input device 210.

Figure 17:
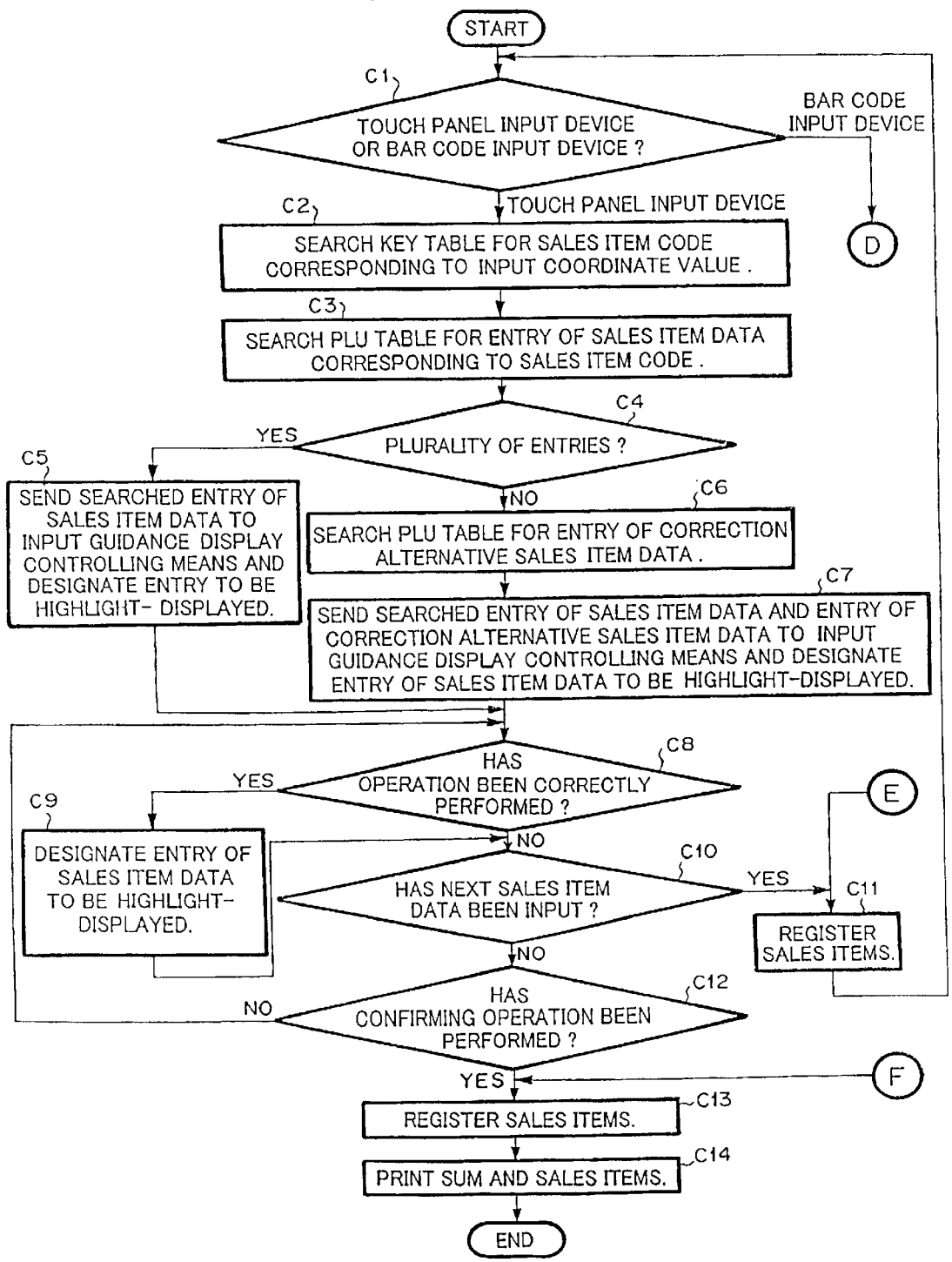
FIG. 17 is a flow chart showing an example of a process of a searching means according to the second embodiment of the present invention.

When the coordinate value of the menu button MB1 has been input, the searching means 73 sends the coordinate value and the coordinate value of the selection button SB1 that has been most recently input to the designated sales item searching means 74 (at step C1 shown in FIG. 17).

Thus, the designated sales item searching means 74 searches a sales item code "0011" corresponding to a pair of an entry of position information of the menu button MB1 and an entry of position information of the selection button SB1 from the button table 209 shown in FIG. 14. In addition, the designated sales item searching means 74 searches an entry of sales item data "apple, 100 yen" corresponding to the sales item code "0011" from the PLU table 208 shown in FIG. 15 (at steps C2 and C3).

Thereafter, since the operator may have mistakenly operated a selection button on the screen, the searching means 73 sends the coordinate values of the menu button MB1 and the selection button SB1 to the correction alternative searching means 75 so that it searches entries of sales item data that have been assigned to the menu button MB1 and that is not represented thereon (namely, entries of correction alternative sales item data).

When the coordinate values of the menu button MB1 and the selection button SB1 have been sent to the correction alternative searching means 75, it searches five sales item codes "0021", "0031", 0041", "0051", and "0061" corresponding to pairs of position information of the menu button MB1 and position information of the selection buttons SB2 to SB6 (excluding the selection button SB1 whose coordinate value has been sent) from the button table 209 shown in FIG. 14. Thereafter, the correction alternative searching means 75 searches five entries of sales item data "orange juice, 100 yen", "cake, 250 yen", "beef, 800 yen", "radish, 200 yen", and "frying pan, 3000 yen" corresponding to the five searched sales item codes from the PLU table 208 shown in FIG. 15 (at step C6).

Thereafter, the searching means 73 assigns numbers 1 to 6 to the entry "one apple, 100 yen" of sales item data searched by the designated sales item searching means 74 and the entries "orange juice, 100 yen", "cake, 250 yen", "beef, 800 yen", "radish, 200 yen", and "frying pan, 3000 yen" of correction alternative sales item data searched by the correction alternative searching means 75 and sends the numbered entries to the input guidance display controlling means 72. In addition, the searching means 73 causes the input guidance display controlling means 72 to highlight-display the entry "apple, 100 yen" of sales item data searched by the designated sales item searching means 74 (at step C7). Thus, as shown in FIG. 13, the input guidance display controlling means 72 causes the numbered entries of sales item data and correction alternative sales item data sent from the searching means 73 to be displayed. In addition, the input guidance display controlling means 72 causes the entry "one apple, 100 yen" designated by a button operation of the operator to be highlight-displayed.

When the operator knows that the entry "apple, 100 yen" of sales item data that is highlight-displayed is an entry of sales item data that he or she has tried to reregister, he or she performs an input operation for the next sales item and a confirming operation.

When the input operation for the next sales has been performed, the searching means 73 sends the highlighted entry "apple, 100 yen" to the sales item registering means 78. The sales item registering means 78 performs a sales registering process for registering the entry "apple, 100 yen" to the internal register thereof at step C11. Thereafter, the flow returns to step C1 (at step C11 when the determined result at step C10 is Yes). When the operator has performed the confirming operation, the searching means 73 causes the sales item registering means 78 to perform a sales registering process for registering the highlighted entry "apple, 100 yen" to the register and calculating the sum of sales items that the customer will buy. Thereafter, the searching means 73 causes the printing device 206 to issue a receipt representing sales item data of sales items that the customer will buy and the sum thereof (at steps C13 and C14 when the determined result at step S12 is Yes).

When the operator has correctly operated a menu button and a selection button to register a sales item, the above-described process is performed. On the other hand, if the operator has mistakenly operated a selection button, the following process is performed.

Now, it is assumed that the operator tries to register a sales item "orange juice" represented on the menu button MB1. At this point, as a correct button operation, the operator touches the selection button SB2 and then the menu button MB1. However, in this example, it is assumed that the operator mistakenly touched the selection button SB1 and then the menu button MB1. This situation tends to occur in the case that the operator is well accustomed with the screen touch operation and he or she touches a button without carefully checking for selection buttons and sales item names represented on menu buttons.

When the operator has mistakenly performed a button operation, the designated sales item searching means 74 searches an entry "apple, 100 yen" of sales item data of the sales item "apple" designated by a button operation (at steps C2 and C3). The correction alternative searching means 75 searches entries "orange juice, 100 yen", "cake, 250 yen", "beef, 800 yen", "radish, 200 yen", and "frying pan, 3000 yen" of correction alternative sales item data (at step S6). Thereafter, as shown in FIG. 13, the input guidance display controlling means 72 causes six numbered entries 1 to 6 of sales item data to be displayed on the input guidance portion 81. At this point, the input guidance display controlling means 72 causes the entry "apple, 100 yen" designated by the button operation to be highlight-displayed so as to distinguish it from the entries "orange juice, 100 yen", "cake, 250 yen", "beef, 800 yen", "radish, 200 yen", and "frying pan, 3000 yen" as correction alternative sales item data.

When the operator sees the contents displayed on the input guidance portion 81, since the entry "apple, 100 yen" other than the entry "orange juice, 100 yen" that he or she tries to register is highlight-displayed, he or she knows that he or she has mistakenly performed a button operation and checks whether or not the entry that he or she tries to register matches one of the entries of correction alternative sales item data displayed on the input guidance portion 81. Since the entries of correction alternative sales item data include the entry "2. Orange juice, 100 yen" that he or she tries to register, he or she performs a correcting operation by pressing the ten key "2" or the down arrow key "↓" on the keyboard 204 so as to highlight-display (select) the numbered entry "2. Orange juice, 100 yen".

When the operator has performed the correcting operation (namely, the determined result at step C8 is Yes), the searching means 73 causes the input guidance display controlling means 72 to highlight-display the numbered entry "2. Orange juice, 100 yen" (at step C9). Thus, the input guidance display controlling means 72 highlight-displays the entry "orange juice, 100 yen" of sales item data.

When the operator has checked that the entry "orange juice, 100 yen" that he or she tries to register is highlight-displayed, he or she performs an input operation for the next sales item and a confirming operation. Thus, the sales item registering means 78 performs a sales registering process for the highlighted entry "orange juice, 100 yen" rather than the entry "apple, 100 yen" that he or she has mistakenly designated by an incorrect button operation.

Next, a method of which a plurality of sales items are registered with one sales item code will be described.

As shown in FIG. 14, the button table 209 contains the same sales item code "0016" corresponding to combinations of an entry of position information of the menu button MB6 and entries of position information of the selection buttons SB1 to SB6. On other hand, as shown in FIG. 15, the PLU table 208 contains five entries "small eel, 500 yen", "medium eel, 800 yen", "large eel, 1000 yen", "very large eel, 1500 yen", and "ultra large eel, 3000 yen" of sales item data corresponding to the sales item code "0016". The sales item name field correlatively contains selection buttons and sales item names.

Now, it is assumed that the operator has touched the first selection button SB1 and then the menu button MB6 so as to designate a sales item "small eel".

When the operator has performed the above-described button operation, the designated sales item searching means 74 searches the sales item code "0016" from the button table 209 shown in FIG. 14. In addition, the designated sales item searching means 74 searches pairs of entries of sales item data and entries of selection button information "selection 1, small eel, 500 yen", "selection 2, medium eel, 800 yen", "selection 3, large eel, 1000 yen", "selection 4, very large eel, 1500 yen", and "selection 5, ultra large eel, 3000 yen" corresponding to the sales item code "001" from the PLU table 208 shown in FIG. 15 (at steps C2 and C3 shown in FIG. 17).

When the designated sales item searching means 74 has searched the five pairs of entries of sales item information and entries of selection button information, since the determined result at step C4 is Yes, the searching means 73 performs the process of step C5. At step C5, the searching means 73 successively assigns numbers to the searched entries of sales item data and sends the numbered entries to the input guidance display controlling means 72. In addition, since the selection button that the operator has most recently touched is the selection button SB1, the searching means 73 causes the input guidance display controlling means 72 to highlight-display the numbered entry 1 "small eel, 500 yen" of sales item data. Thus, the input guidance display controlling means 72 causes the five numbered entries 1 to 5 to be displayed on the input guidance portion 81. In addition, the input guidance display controlling means 72 causes the numbered entry 1 "small eel, 500 yen" to be highlight-displayed.

When the operator knows that the entry of sales item data that he or she has tried to register is highlight-displayed, he or she performs an input operation for the next sales item and a confirming operation. On the other hand, when the entry that the operator has tried to register is not highlight-displayed, he or she performs a correcting operation by inputting a selection number of a relevant entry of correction alternative sales item data with the ten keys and then performs an input operation for the next sales item and a confirming operation.

Next, an operation in the case that a sales item to be registered is designated with the bar code input device 205 will be described.

When the operator inputs a bar code (a sales item code) adhered on a sales item with the bar code input device 205, the searching means 73 sends the input bar code to the bar code searching means 76 (namely, the determined result at step C1 is Yes). Thus, the bar code searching means 76 searches an entry of sales item data corresponding to the bar code from the PLU table 208, successively assigns numbers to searched entries (at least one entry) of sales item data, and sends the numbered entries of sales item data to the input guidance display controlling means 72 (at steps D1 and D2 shown in FIG. 18). The input guidance display controlling means 72 causes the display device 202 to display the numbered entries of sales item data.

When the number of entries of sales item data displayed on the display device 202 is one, after checking that the entry is correct, the operator performs an input operation for the next sales item and a confirming operation. When the operator has performed the input operation for the next sales item (namely, the determined result at step D5 is Yes), the searching means 62 causes the sales item registering means 78 to perform a sales registering process for registering the entry of sales item data to the internal register (at step C11 shown in FIG. 17). When the operator has performed the confirming operation (namely, the determined result at step D6 is Yes), the searching means 62 causes the sales item registering means 78 to perform a sales registering process for registering the entry of sales item data to the register and then calculating the sum of all sales items that the customer will buy corresponding to all entries of sales item data (at step C13 shown in FIG. 17).

On the other hand, when a plurality of entries of sales item data are displayed, the operator performs a selecting operation by inputting a selection number of an entry of sales item data that he or she will register with the ten keys and then performs an input operation for the next sales item and a confirming operation. When the bar code searching means 76 has searched a plurality of entries of sales item data, the input guidance display controlling means 72 waits until the operator performs the selecting operation (until the determined result at step D4 becomes Yes). Thereafter, the flow advances to step D5. When the operator has performed an input operation for the next sales item and an confirming operation, the input guidance display controlling means 72 causes the sales item registering means 78 to perform a sales registering process for an entry of sales item data that he or she has selected (at step C11 and C13 shown in FIG. 17).

As a first effect of the present invention, when the operator designates a sales item to be registered with the menu keyboard, even if he or she mistakenly operates an incorrect selection key, he or she can easily perform a correcting operation. This feature is accomplished in such a manner that an entry of sales item data of a sales item designated by a key operation of the operator and an entry of sales item data of another sales item assigned to a menu key that he or she presses (the latter entry is an entry of correction alternative sales item data) are displayed in different display formats on the display device. When the operator selects an entry of correction alternative sales item data, the selected entry is treated as an entry to be registered.

As a second effect of the present invention, when the operator designates a sales item to be registered with the touch panel input device, even if he or she mistakenly operates an incorrect selection button, he or she can easily perform a correcting operation. This feature is accomplished in such a manner that an entry of sales item data of a sales item designated by a button operation of the operator and an entry of sales item data of another sales item assigned to a menu button that he or she presses (the latter entry is an entry of correction alternative sales item data) are displayed in different display formats on the display device. When the operator selects an entry of correction alternative sales item data, the selected entry is treated as an entry to be registered.

As a third effect, many sales items can be registered with a small number of sales item codes. This feature is accomplished in such a manner that a plurality of entries of sales item data are assigned to each sales item code.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A computer-readable program medium performing a method in conjunction with a POS registering system, the POS registering system comprising a display device, and a menu having a plurality of menu keys and at least one selection key, at least one sales item being assigned to each of the menu keys, each of the selection keys being used to select one of the sales items assigned to each of the menu keys, the computer-readable program medium including a plurality of computer executable instructions stored on the medium, wherein the instructions, when executed by a computer, cause the computer to perform the steps of:

when a first operation including selecting a menu key and a selection key is performed for designating a sales item on the menu, retrieving entries of sales item data of all sales items assigned to the selected menu key from a table, wherein the table contains entries of sales item data of the sales items assigned to each of the menu keys and the sales item data include a name and price of each sales item, and causing to be displayed on the display device all the retrieved entries of sales item data in such a manner that the entry of sales item data of the designated sales item is distinguished from entries of sales item data of correction alternative sales items, the correction alternative sales items being sales items which are assigned to the selected menu key other than the designated sales item; and when a second operation is performed for selecting one of the entries of sales item data of the correction alternative sales items displayed on the display device, treating the selected entry as an entry to be processed.

2. A computer-readable program medium performing a method in conjunction with a POS registering system, the POS registering system comprising a display device, and a menu having a plurality of menu keys and at least one selection key, at least one sales item being assigned to each of the menu keys, each of the selection keys being used to select one of the sales items assigned to each of the menu keys, the computer-readable program medium including a plurality of computer executable instructions stored on the medium, wherein the instructions, when executed by a computer, cause the computer to perform the steps of:

searching a table, wherein the table contains entries of sales item data of the sales items assigned to each of the menu keys and the sales item data includes a name and price of each sales item, for an entry of designated sales item data which corresponds to a sales item designated by an operation on the menu, the operation including selecting a menu key and a selection key to which a sales item to be designated is assigned;

searching the table for entries of correction alternative sales item data of sales items which are assigned to the menu key to which the designated sales item is assigned and which have not been designated by the operation;

causing to be displayed on the display device the entry of the designated sales item data and the entries of correction alternative sales item data in such a manner that the entry of the designated sales item data is displayed in a different format from the entries of correction alternative sales item data; and when one of the entries of correction alternative sales item data is selected, registering the selected entry of correction alternative sales item data as an entry to be registered.

3. A computer-readable program medium performing a method in conjunction with a POS registering system, the POS registering system comprising a display device, and a menu having a plurality of menu keys and at least one selection key, at least one sales item being assigned to each of the menu keys, each of the selection keys being used to select one of the sales items assigned to each of the menu keys, the computer-readable program medium including a plurality of computer executable instructions stored on the medium, wherein the instructions, when executed by a computer, cause the computer to perform the steps of:

searching a key table, wherein the key table contains the codes of sales items and operations on the menu in such a manner that a code of a sales item is designated by each operation on the menu, each operation including selecting a menu key and a selection key, for a sales item code corresponding to an operation on the menu and further searching a PLU table, wherein the PLU table contains entries of sales item data of the sales items assigned to each of the menu keys, the sales item data including a name and price of each sales item, the entry of sales item data being correlated to a code of the sales item, for an entry of designated sales item data corresponding to the searched sales item code;

searching the key table for sales item codes corresponding to sales items which are assigned to the menu key operated and which have not been designated and further searching the PLU table for entries of correction alternative sales item data corresponding to the searched sales item codes;

causing to be displayed on said display device the entry of the designated sales item data and the entries of correction alternative sales item data in such a manner that the entry of the designated sales item data is displayed in a different format from the entries of correction alternative sales item data; and when one of the entries of correction alternative sales item data is selected, registering the selected entry of correction alternative sales item data as an entry to be registered.

4. The computer-readable program medium as set forth in claim 3:

wherein the menu keys comprise a special menu key to which a plurality of sales items are assigned, the same sales item code being assigned to each of the sales items assigned to the special menu key;

wherein the PLU table correlatively contains sales item codes, entries of sales item data of sales items, and entries of selection key information, one sales item code being assigned to a plurality of sales items, entries of selection key information representing selection keys for selecting sales items to which the same sales item code is assigned;

wherein the key table contains sales item codes, each of which is assigned in common to the plurality of sales items assigned to the special menu key;

wherein the searching the key table step further comprises searching the key table sales item code corresponding to an operation, the operation including selecting the special menu key on the menu for designating a sales item, and further searching the PLU table for pairs of an entry of sales item data and an entry of the selection key information corresponding to the searched sales item code; and wherein among entries of sales item data corresponding to the searched sales item code, an entry selected by selecting one of the selection keys becomes an entry of the designated sales item data, and entries not selected by selecting one of the selection keys become entries of correction alternative sales item data.

* * * * *